Aug. 1, 1944.  D. G. FAWKES  2,354,987
TOGGLE OPERATED VALVE
Filed Jan. 19, 1942  2 Sheets-Sheet 1

Inventor:
Donald G. Fawkes
By Joseph O. Lange, Atty.

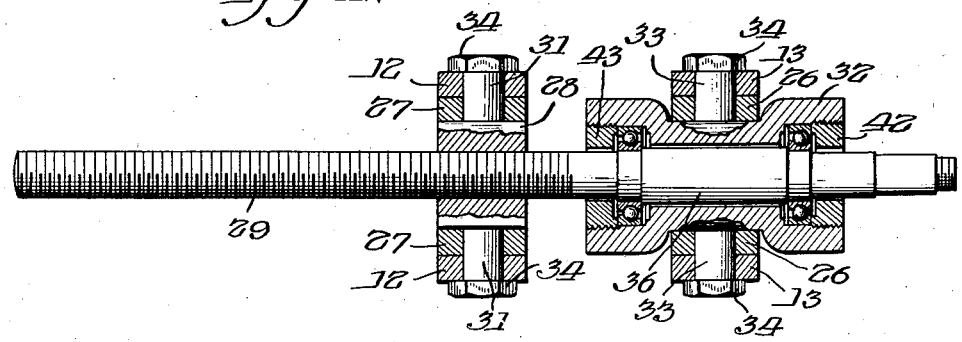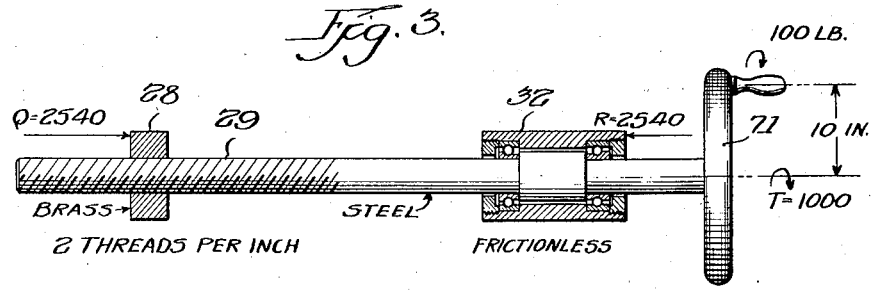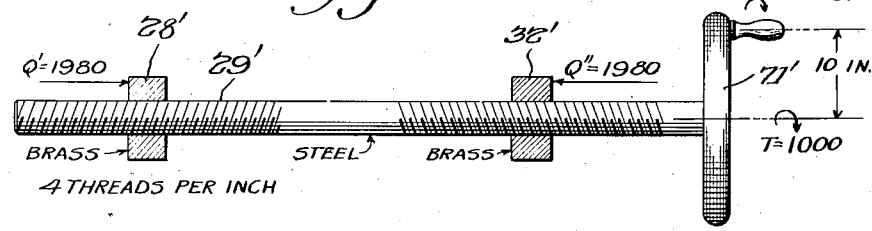

Patented Aug. 1, 1944

2,354,987

UNITED STATES PATENT OFFICE 2,354,987

TOGGLE OPERATED VALVE

Donald G. Fawkes, Chicago, Ill., assignor to Crane Co., Chicago, Ill., a corporation of Illinois Application January 19, 1942, Serial No. 427,244

5 Claims. (Cl. 74—520)

This invention relates to valve actuating means and particularly as applied to valves or like devices having a reciprocably operated member or stem. More especially, it relates to improvements in toggle operating mechanisms therefor.

Among the several objects of my invention has been the provision of a simplified mounting for the motor, in the case of a power operated toggle device, affording substantial savings in weight of metal and cost. Further, it has been an object to provide a toggle operated device which may readily be converted from power operation to hand operation and vice versa. Greater overall efficiency of the toggle device has thereby resulted in a substantially higher output with a given amount of input or requiring a substantially lower input for a given amount of output.

These objects are attained by mechanism illustrated in the accompanying drawings, in which Fig. 1 is a sectional view of my toggle device as it is employed in operating a valve.

Fig. 2 is a partial sectional view along the line 2—2 of Fig. 1.

Figs. 3 and 4 are force diagrams, respectively, of my toggle device shown in Figure 1, and the conventional toggle device heretofore utilized for valves and the like.

Figure 1:
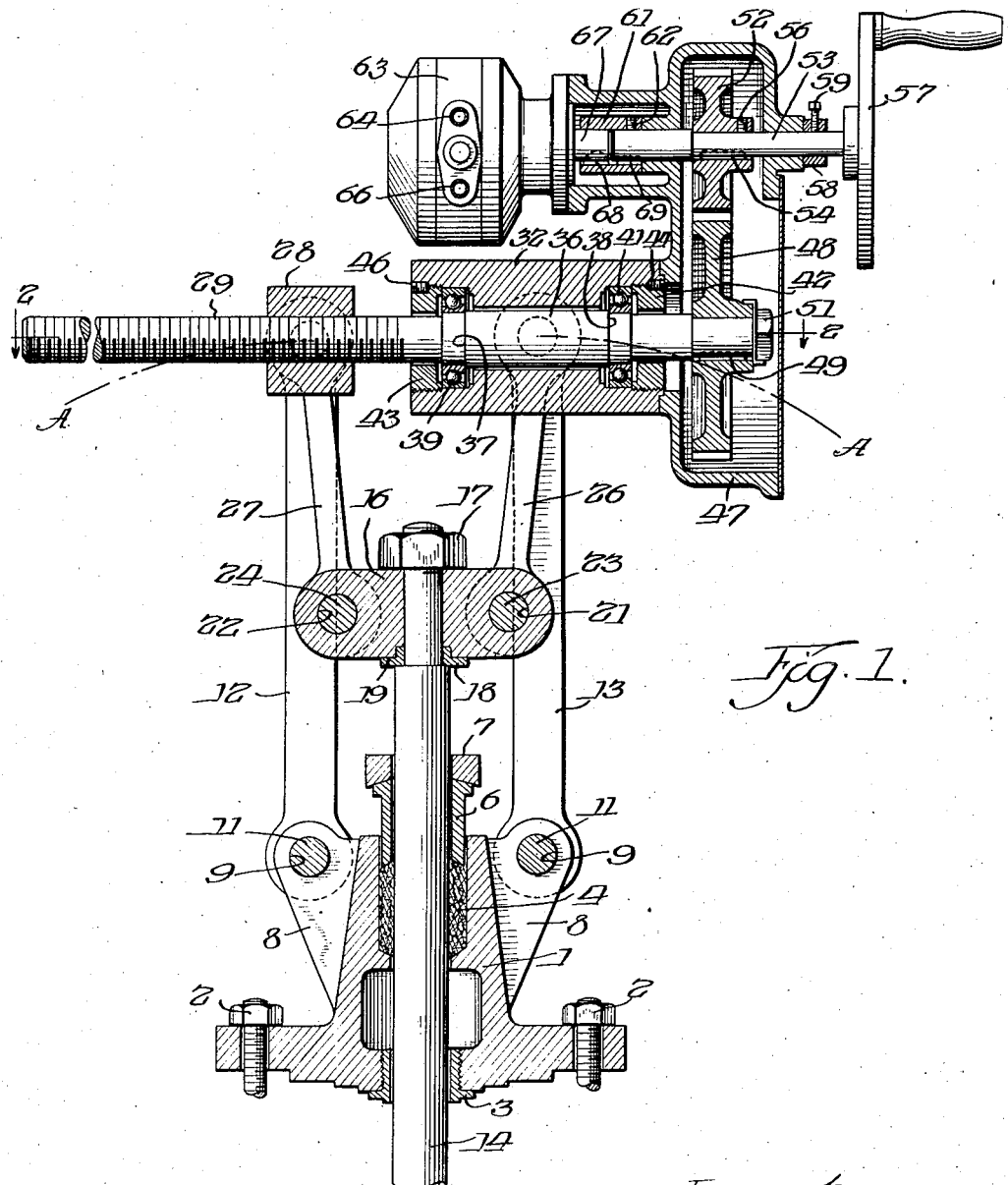

Referring now to Fig. 1, a valve bonnet, or upper portion, 1 which may be fastened to a conventional valve body (not shown) by means of bolts 2 is presented to illustrate one application for my improved toggle; the bonnet is shown with the usual stem hole bushing 3, the stuffing box packing 4, the gland 6 and the gland follower 7. Diametrically opposed ears or lugs 8 are formed with apertures 9, the latter being formed to accomodate pins 11 which serve as a pivotal mounting for the supporting members or arms 12 and 13. The usual stem 14, reciprocably movable, is journaled within the valve bonnet and is provided with a cross piece 16 secured to the upper end thereof by means of the nut 17. An adjusting bushing or shim 18 of suitable thickness is interposed between the cross member 16 and the circular shoulder 19 formed at the upper end of the stem for adjusting the vertical position of the stem. Thus by decreasing the thickness of the adjusting bushing or shim 18 the stem 14 will be in a slightly higher position than shown in Fig. 1, and by increasing the thickness of the bushing 18 or adding others the position of the stem may be lowered with relation to the cross arm 16. At the extremities of the cross member 16 the drilled holes 21 and 22 are provided and adapted to receive resepectively the pins 23 and 24, the pins being utilized to pivotally mount the operating members or arms 26 and 27 respectively.

An apertured, internally threaded block 28 is screw threadedly engaged with the threaded end portion of the shaft 29. As shown more clearly in Fig. 2, the extensions or bosses 31 are provided on the block 28 to provide for the pivotal mounting of the upper limits of the arms 12 and 27. A similar block 32, somewhat larger in size than the block 28, is mounted on the opposite end of the shaft 29 and has the extensions 33 for pivotally mounting the arms 13 and 26, the nuts 34 being provided for the end portions of the extensions 31 and 33 to maintain the respective supporting and operating arms in place. The block 32 has been constructed so that the shaft 29 may rotate freely within it and yet the block 32 and the shaft 29 will not be moved axially with respect to one another. The latter arrangement has been accomplished by enlarging the portion 36 of the shaft 29 to form shoulders 37 and 38 upon which the inner races of the thrust bearings 39 and 41, respectively, may bear, the outer races being formed to fit snugly within the block 32 in abutment against the screwed-in bushings 42 and 43, respectively. The set screws 44 and 46 may be employed to maintain the bushings 42 and 43 in any desired predetermined position.

Referring again to Fig. 1, in the device illustrated, the block 32 constitutes substantially an extension of the gear housing 47 to which it is attached by any suitable means, as indicated, or, if preferred, the block and housing may be constructed integrally. Within the gear casing 47, a driven gear 48 is attached to the end limit of the shaft 29 by means of the key 49 and the retaining nut 51. A driving pinion 52 is positioned within the gear casing in meshed relation with the driven gear 48, the pinion 52 being attached to the handwheel shaft 53 by means of the key 54 and the set screw 56, or in any other desired manner. A handwheel 57 or other actuating handle may be mounted in any suitable manner upon the exterior end portion of the shaft 53. Endwise movement of the shaft 53 is limited by the collar 58 and its corresponding set screw 59 immediately beneath the handwheel 57 and also by the bushing 61 at the opposite end of the handwheel shaft, this latter bushing being set in place upon the stem by means of the screw 62, or equivalent means.

In the event that it becomes desirable to operate the valve from a remote location in addition to operating it by means of the handwheel 57 at the valve proper, provision is made for a fluid pressure motor 63 having the pressure supply and exhaust ports 64 and 66 to be attached to an extension of the gear casing, as shown in Fig. 1. Rotary motion of the rotor shaft 67 may be transmitted to the handwheel shaft 53 through the bushing 61; in Fig. 1, a Woodruff or semicircular key 68 connects the bushing 61 to the rotor 67 and a straight key 69 connects the shaft 53 with the bushing 61. Other modifications of this arrangement obviously may be used. For instance, any type of power motor, such as an electric motor or pneumatic motor, or even a piston and cylinder may be substituted for the motor 63; and in some cases a flexible coupling may be utilized between the motor and the handwheel shaft.

In the operation of my device as shown in the drawings, rotation of the shaft 53 either by the handwheel 57 or by the power operation illustrated by the fluid motor 63 causes the driving pinion 52 to rotate which in turn transmits rotary driven motion to the gear 48 which is keyed to the shaft 29. Since the larger block 32 is not movable longitudinally along the shaft 29, as previously explained, rotation of the shaft in one direction or another will cause the smaller block 28 alone to be screwed outwardly or inwardly along the shaft. Thus, if the block 28 is moved outwardly along the shaft 29, both blocks 28 and 32 will move apart symmetrically from the vertical centerline of the valve stem 14 as the supporting arms 12 and 13 and the lifting arms 26 and 27 pivot outwardly in an arcuate path. As the supporting arms 12 and 13 swing outwardly in this manner about the pins 11, the entire operating unit including the shaft 29, the blocks 28 and 32, the gear box 47 and the fluid motor 63 will be lowered for obviously it may be seen that when the supporting arms 12 and 13 are spread and move arcuately apart in the fully open position they will not be as high vertically above the pins 11 as when they are in line above them in the fully closed position, as shown in Fig. 1. The arcs A—A struck from the pins 11 indicate the path through which the blocks 28 and 32 respectively move from the open to the closed position or vice versa. Since the operating arms 26 and 27 are relatively shorter than the supporting arms 13 and 12 the former will pivot about the pins 23 and 24 much more rapidly than the supporting arms 13 and 12 pivot about the pins 11, thereby more than neutralizing the downward movement of the blocks 28 and 32 along the arcs A—A when they are spread apart. Thus the valve stem 14 is made to rise; conversely, when the blocks 28 and 32 are drawn together from a fully separated position this faster pivotal movement of the smaller arms will more than neutralize the lift of the blocks along the arcs A—A and cause the valve stem 14 to be lowered to the closed position as shown in Fig. 1.

The toggle mechanism shown represents a radical departure over prior conventional toggle mechanisms (illustrated in Fig. 4) in which the shaft 29' corresponding to the shaft 29 herein illustrated has previously been threaded on both ends from opposite directions, that is, with right and left hand threads; and the blocks 28' and 32' corresponding to the blocks 28 and 32 of the instant invention have both been threadedly engaged with the shaft. Thus, upon rotation of the shaft, the blocks heretofore have been independently movable along the shaft and have presented a considerable problem of mounting a motor upon the valve for power operated rotation of the shaft. For instance, if the motor were connected directly to one of the blocks as done herein a complicated sliding connection of some kind would have had to be constructed between the motor and the shaft. On the other hand, if the motor were rigidly fixed to a portion of the valve casing a moving connection between the motor and the shaft would again be necessary to compensate for the vertical movement of the shaft in the event that movable supporting arms, such as my arms 12 and 13, are utilized. A third alternative has been to mount the entire motor and gear assembly, including the shaft, fixedly above the valve casing by means of a non-pivotal support, this latter method being extremely bulky as well as objectionably expensive.

Another advantage of constructing a toggle operated mechanism in accordance with the invention herein disclosed may be seen by reference to Fig. 1. To convert the combination hand- and power-operated mechanism to a completely hand-operated mechanism it is necessary only to disconnect the gear casing 47 from the block 32 and to replace the gear 48 by a handwheel 71 of suitable size, as illustrated in Fig. 3. From the manufacturer's standpoint, the instant arrangement possesses a desirable feature for it it unnecessary to carry two separate stocks of supports, shafts, etc. for respective services where hand operation only or where motor operation only is required. From the customer's or user's point of view, this arrangement is desirable for he may change over from one type of operation to another type with the least possible expense; for instance, if a user purchases a toggle valve with hand operation only and later discovers that motor operation is more desirable, he need only remove the handwheel from the shaft 29 and replace it with the gear box and motor shown in Fig. 1. To my knowledge no one previously has constructed a toggle operated valve or the like in which the changeover from hand operation to motor operation or vice versa may be accomplished with so little effort and expense. To my knowledge it is a distinct innovation to construct a toggle operated valve in which the motor or power operation means rides along with one of the spreader blocks (32 in the drawings).

In order to illustrate more clearly the mechanical advantage and increased work efficiency achieved by the present toggle mechanism in contrast to prior toggle mechanisms, Figs. 3 and 4 have been included in the drawings.

Fig. 3 illustrates the toggle mechanism shown in Fig. 1 diagrammatically and in a much more simplified manner. For simplicity, the handwheel 71 is attached directly to the shaft 29. The ball bearing connection between the block 32 and the shaft 29 may be assumed to be frictionless for all practical purposes. The screw portion of the shaft 29 has two 29° Acme threads per inch with a thread pitch diameter $(d)$ of 1.71''. The shaft 29 is of steel and the block 28 is of brass; for this combination, the coefficient of friction, $\mu$, has been experimentally determined as approximately 0.14.

Fig. 4 is a simplified illustration of the type of toggle mechanism previously employed in the operation of valves and the like and which was heretofore considered the most efficient mechanism for toggle operated units. As in Fig. 3, the thread pitch diameter is 1.71'' and the shaft 29' and the threaded blocks 28' and 32' are of such materials that the coefficient of friction, $\mu'$, is 0.14. The screw portions of the shaft 29' are formed with four 29° Acme threads per inch in order that the blocks 28' and 32' may be moved apart, or vice versa, the same amount per revolution of the handwheel as the blocks 28 and 32 of Fig. 3.

Throughout the subsequent calculations, the assumed input to the handwheels 71 and 71' will be the same, namely 100 pounds force exerted on the rims 10 inches from the center=1000 pound inches of applied torque=$T$.

The formula for the conversion of torque to axial thrust has been taken from Bulletin No. 247 of The University of Illinois, Engineering Experiment Station entitled "An experimental investigation of the friction of screw threads," by Clarence W. Ham and David G. Ryan. This formula, set out immediately below, has been experimentally checked in the laboratories of Crane Co. for threads such as those referred to in Figs. 3 and 4 and found to conform accurately to independent test results.

The formula, as presented by Bulletin No. 247, is:

(1) $$T = \frac{Qd}{2}\left[\frac{\cos B \tan A + \mu}{\cos B - \mu \tan A}\right]$$

where $T$=applied torque, in pound inches (1000 in Figs. 3 and 4)
$Q$=axial thrust of block on screw, in pounds
$B$=½ included thread angle (14.5° for 29° Acme thread)
$\cos B$=0.968 (for 29° Acme thread)
$A$=mean helix angle $$\tan A = \frac{\text{lead}}{\text{pitch diameter in inches}} = \frac{\frac{1}{\text{number of threads per inch}}}{\text{pitch diameter in inches}}$$

$d$=mean or pitch diameter, in inches (1.71, in Figs. 3 and 4)
$\mu$=coefficient of friction (0.14 for steel on brass)

Solving Equation 1 for $Q$, it becomes (2) $$Q = \frac{2T}{d}\left[\frac{\cos B - \mu \tan A}{\cos B \tan A + \mu}\right]$$

Now, solving for the axial thrust, $Q$, exerted by the shaft 29 upon the block 28 on the basis of the assumptions above made with respect to Fig. 3, (3) $$Q = \frac{(2)(1000)}{1.71}\left[\frac{0.968 - 0.14\left\{\frac{(\frac{1}{4})}{1.71}\right\}}{0.968\left\{\frac{(\frac{1}{4})}{1.71}\right\} + 0.14}\right]$$

Upon simplifying, this expression becomes (4) $$Q = 2540$$

Obviously, there will be an equal and opposite reaction $R$=2540 pounds exerted on the other block 32.

Thus, an applied torque of 1000 pound inches on handwheel 71 causes blocks 28 and 32 to be spread apart by a force of 2540 pounds.

Directing attention now to Fig. 4, the spreading force exerted on the blocks 28' and 32' by a torque of 1000 pound inches applied to the handwheel 71' will be calculated.

First, it must be understood that, of the 1000 pound inches torque applied to the shaft 29', half must be allocated to the exertion of thrust on the block 28' and the other half must be allocated to the exertion of thrust on block 32'. In addition to both blocks 28' and 32' being threaded, it should be borne in mind that there are twice as many threads per inch as on the structure described in connection with Fig. 3, for the reasons mentioned.

Applying Equation 2 to the conditions assumed in connection with block 28' of Fig. 4, it becomes (5) $$Q' = \frac{2T}{d}\left[\frac{\cos B - \mu \tan A}{\cos B \tan A + \mu}\right]$$

(6) $$Q' = \frac{(2)(500)}{1.71}\left[\frac{0.968 - 0.14\left\{\frac{(\frac{1}{8})}{1.71}\right\}}{0.968\left\{\frac{(\frac{1}{8})}{1.71}\right\} + 0.14}\right]$$

Upon simplifying, this expression becomes (7) $$Q' = 1980$$

Similarly, (8) $$Q'' = 1980, \text{ for block } 32'$$

Because the shaft 29' is freely floatable to equalize the forces applied to the blocks 28' and 32', the latter will therefore be spread apart by a force of 1980 pounds.

Thus, an advantage of my construction appears in that, by mounting the block 32 in a comparatively frictionless manner and doubling the helix angle of the threads with respect to threads of Fig. 4, provision has been made enabling the application of a spreading force (or a retracting force) 560 pounds greater than heretofore has been obtainable with conventional toggle mechanisms. In ultimate effect, the effective mechanical advantage has actually been increased more than 28% and at the same time doubled the thread angle, a result which has been considered impossible prior to my careful analysis of the problem as above outlined.

Another advantage of my device (Fig. 3) compared with toggle mechanisms employed previously (Fig. 4) is the achievement of higher work efficiency, as the following calculations will demonstrate.

Referring again to Fig. 3, the work input per revolution is expressed by the formula (9) work input ($I$) = force $X$ distance applied
(10) $\quad\quad\quad$ = (100) (circumference of handwheel)
(11) $\quad\quad\quad$ = (100) ($\pi \times 10$)

Therefore

(12) $\quad I = 1000\pi = 3140$ pound inches

The work output is expressed by the formula

(13) work output ($O$) = force $X$ distance applied

Since block 32 is not moved with respect to the shaft 29, no work is expended there since it has been assumed that the connection is frictionless. The only work done, then, is expended in moving block 28 half an inch along the shaft 29 against the resistance load of 2540 pounds. The work output per revolution, then, is

(14) $\quad O = 2540 \times \frac{1}{2} = 1270$ pound inches

(15) $\therefore$ efficiency (Fig. 3) $= \frac{O}{I} = \frac{1270}{3140} = .404 \cong 40.4\%$ Directing attention now to Fig. 4, the work input per revolution is the same as for Fig. 3, or

(16) $\quad I' = 3140$ pound inches

The work output ($O'$) = work performed on block 28' + work performed on block 32' or

(17)  $O' =$ (force applied to block 28′)

(distance block 28′ is moved) +

(force applied to block 32′)

(distance block 32′ is moved)

As already determined the force applied to each block is 1980 pounds, and since there are four threads per inch each block will move ¼″ per revolution of the shaft. Substituting these values in Equation 17, it becomes

(18)  $O' = (1980)(\frac{1}{4}) + (1980)(\frac{1}{4}) = 990$ pound inches

Therefore,

(19)  efficiency (Fig. 4) $= \frac{O'}{T'} = \frac{990}{3140} = .315 \cong 31.5\%$ Thus, another advantage of my construction appears from the fact that the work efficiency of Fig. 3 is 40.4% compared with 31.5% for Fig. 4. Stating this another way, $$\frac{8.9}{31.5} \times 100 = 28.2\% \text{ more}$$

of the work applied to the handwheel is utilized in spreading (or retracting) the blocks 28 and 32. With my invention, I may therefore utilize a smaller, cheaper motor (in the case of power operation) than previously known toggle mechanisms to give the same results; or conversely, I may operate a larger valve, or the like, with the same size motor as compared with previous mechanisms.

Although my invention is exceedingly simple in view of the disclosures herein made, consisting, in the last analysis, of a toggle shaft having but one toggle block threaded to the shaft instead of the conventional pair of threaded blocks, this contribution is an extremely important one from the standpoints of securing the maximum possible work output and effective mechanical advantage from a given power source as has been pointed out in the foregoing detailed calculations, in addition to making the toggle mechanism lighter, less expensive, and more desirable from many standpoints than the conventional double threaded toggle mechanisms heretofore used.

While my inventive contribution has been illustrated and described specifically in connection with the operation of valves, it is emphasized that it is applicable generally to enhancing the desirability of all toggle mechanisms. Therefore, I wish to be limited only within the spirit of my invention as defined by the scope of the appended claims.

I claim:

1. A toggle-operated device comprising a housing having a stem reciprocably guided therein, a transversely extending rotatable shaft threaded at one end and adapted to be connected to a means of rotation, said shaft being rotatably mounted within a pair of spaced-apart apertured blocks, one of said blocks being internally threaded to cooperate with said threaded portion of said shaft, the other of said blocks being interlockably engaged with the opposite end portion of said shaft so as to permit relative rotation but to restrain relative axial movement between said shaft and said other block, a cross-member secured to said stem, means provided on the stem for adjusting the position of the cross-member thereon, a pair of arms journaled on said blocks and in pivotal engagement with the cross-member, a pair of supporting arms journaled on said blocks and pivotally mounted on said housing.

2. In a toggle mechanism for assembly with a reciprocably movable stem, the combination including a housing, a reciprocably movable stem guided within a portion of said housing, a transversely extending shaft threaded at one end, the said shaft having opposing shoulders formed on the other end, a threaded block engaging the threaded end of said shaft for axial movement thereon, a bearing block mounted on the shaft adjacent the shoulders formed thereon, said bearing block having recesses formed in each end thereof, anti-friction bearings mounted in said recesses for engagement with the shoulders formed on the shaft to permit relative rotational movement and to prevent relative axial movement, a cross member secured to said stem, means provided on the stem for adjusting the position of the cross member thereon, a pair of arms journaled on said blocks and in pivotal engagement with the cross member, a pair of supporting arms journaled on said blocks and pivotally mounted on said housing, said bearing block being engaged by one of each of said pairs of arms intermediate its ends, a gear case secured to the outer end of the bearing block, a driven gear secured to the unthreaded end of said shaft, a driving gear journaled in said gear case for engagement with said driven gear, a motor mounted on the gear case and disposed inwardly therefrom for actuating the driving gear, and a handwheel engaging the driving gear for manual operation and disposed outwardly from the gear case.

3. In a valve, the combination with a valve housing and a reciprocably movable valve stem guided within a portion of said housing, of a toggle mechanism comprising a transversely extending shaft threaded at one end, said shaft being rotatably mounted within a pair of spaced-apart apertured blocks in substantially the same plane, one of said blocks being internally threaded to cooperate with the threaded portion of said shaft, the other of said blocks being interlockably engaged with the opposite end portion of said shaft so as to permit relative rotation thereof but inhibiting relative axial movement between the said shaft and said other block, a pair of arms journaled on said blocks and in pivotal engagement with means rigid with said stem, a pair of supporting arms journaled on said blocks and pivotally mounted on said housing, and actuating means mounted upon the said block which interlockably engages the transverse shaft.

4. In a valve, the combination with a valve housing having a reciprocable stem slidable therewithin, of a toggle mechanism comprising a horizontal rotatable shaft, a pair of blocks mounted in cooperative relation with said rotatable shaft, one of said blocks threadedly cooperating with said shaft so that rotation of the said shaft causes axial movement of the said block, the other of said blocks serving as the journaling means for the shaft and being interlockably assembled with said shaft so that axial movement of said block relative to said shaft is prevented, a pair of arms journaled on said blocks and in pivotal engagement with means rigid with said reciprocable stem, a pair of supporting arms journaled on said blocks and pivotally mounted on said housing, and actuating means therefor comprising combined manual and motor driven means cooperating with the said interlocked block to rotate the said horizontal shaft.

5. In a valve, the combination with a valve housing having a reciprocably movable member slidable therewithin, of a toggle mechanism comprising a partly threaded shaft positioned transversely to the said reciprocably movable member, a pair of apertured block members cooperating with the said shaft, one of said apertured block members being movable relative to said shaft when the latter is rotated, the other of said apertured block members being axially immovable with respect to said transverse shaft when the latter is rotated, a pair of arms journaled on said blocks and in pivotal engagement with means rigid with said reciprocably movable member, a pair of supporting arms journaled on said blocks and pivotally mounted on said housing, the said shaft having at an unthreaded portion thereof shouldered means normally journaled within the said axially immovable block member, friction reducing means mounted adjacent the shouldered means of the said shaft within the said latter block member.

DONALD G. FAWKES.